July 15, 1941.　　W. L. GROENE　　2,249,242
METHOD OF TREATING CRANKSHAFTS
Filed Jan. 2, 1940　　6 Sheets-Sheet 1
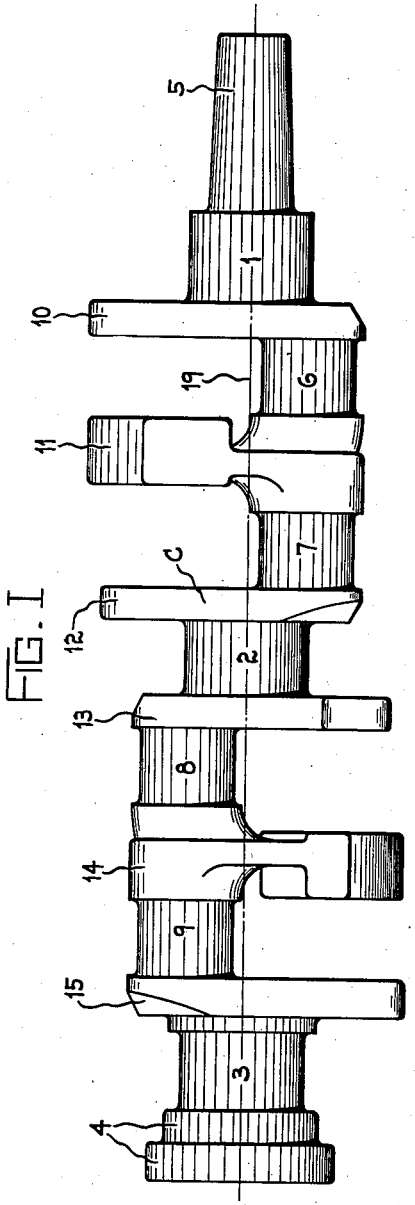
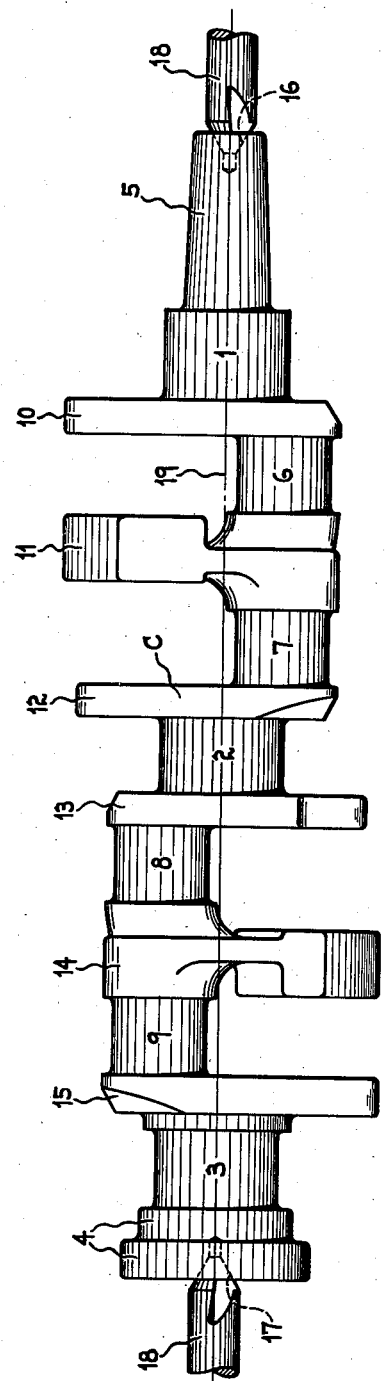
INVENTOR.
Willard S. Groene July 15, 1941.
W. L. GROENE
2,249,242
METHOD OF TREATING CRANKSHAFTS
Filed Jan. 2, 1940
6 Sheets-Sheet 2
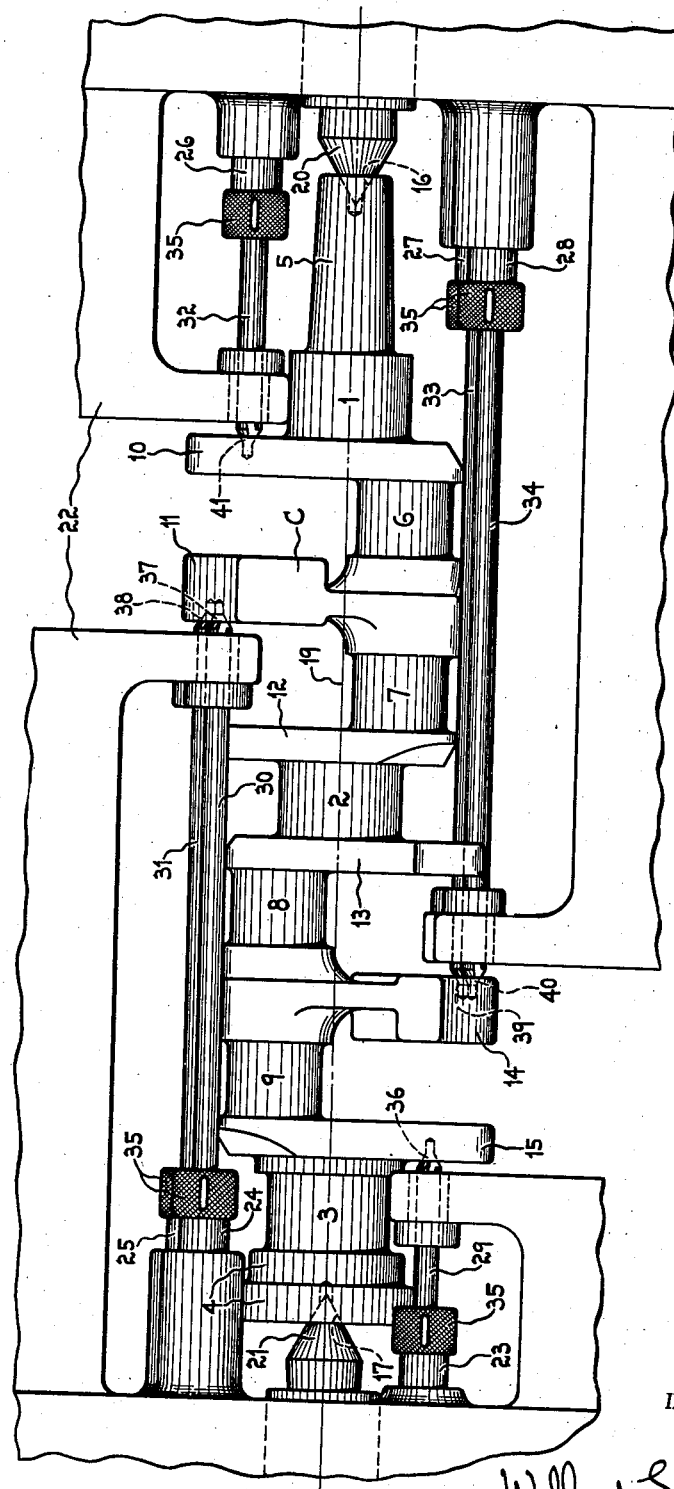
FIG. II
INVENTOR.
Willard L. Groene

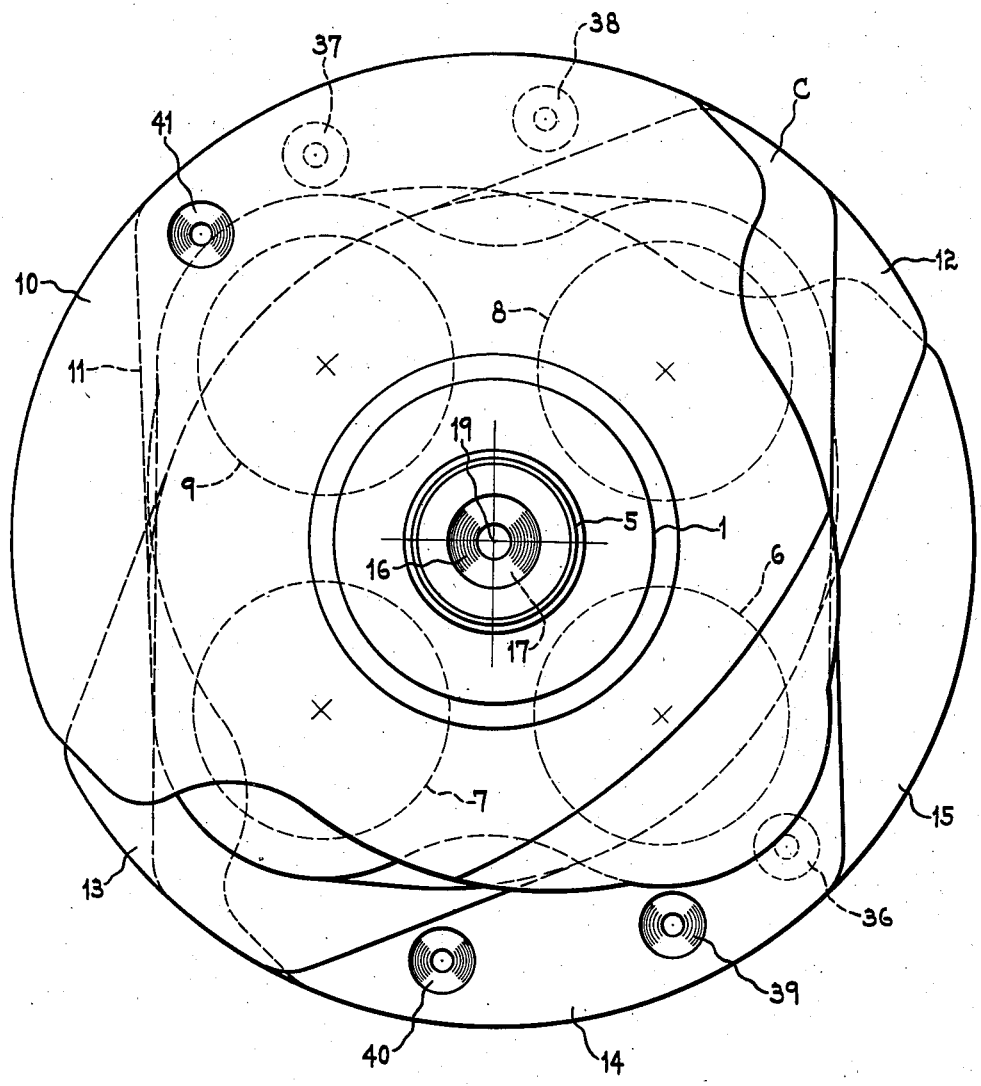
FIG. IV

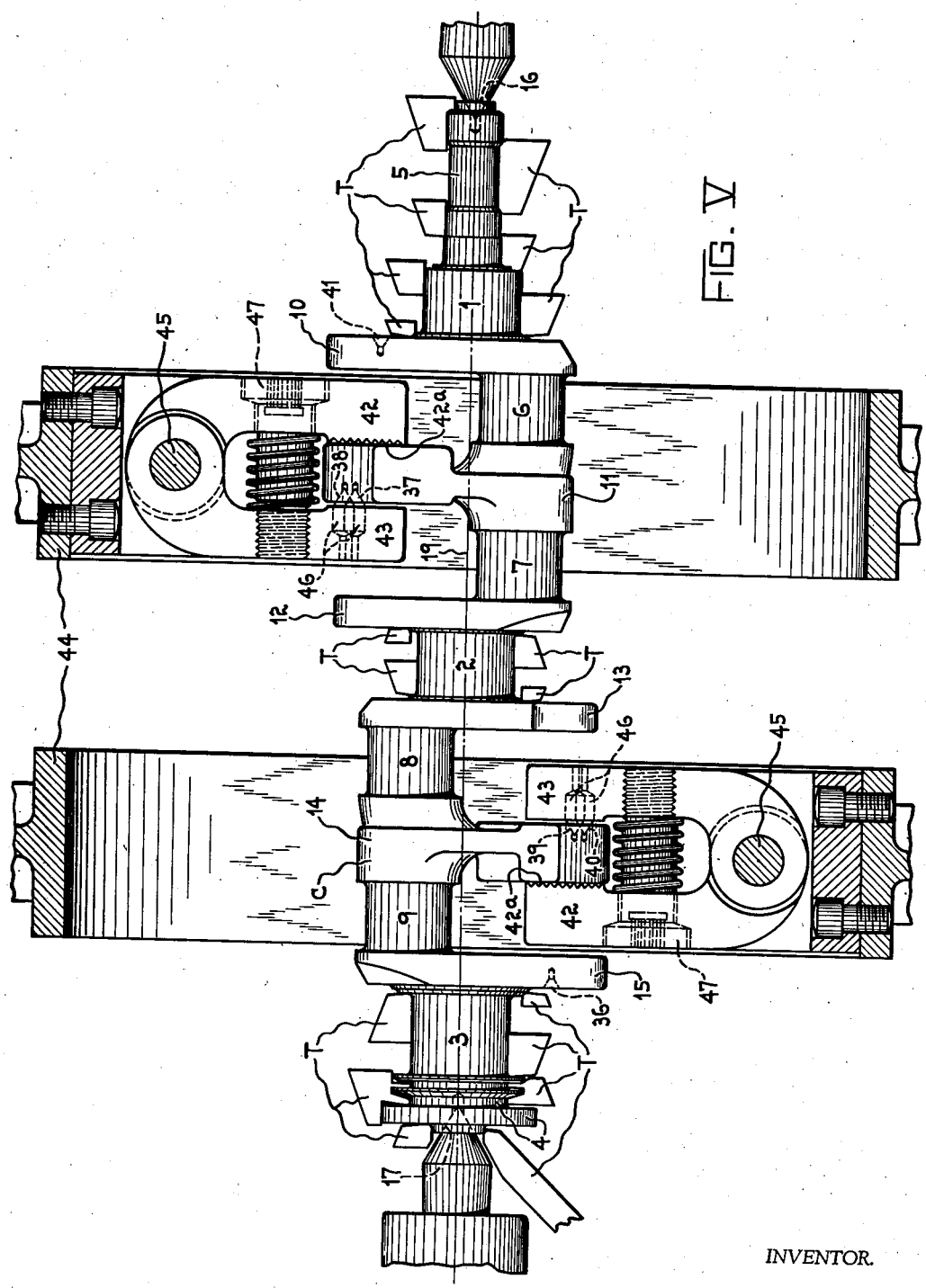

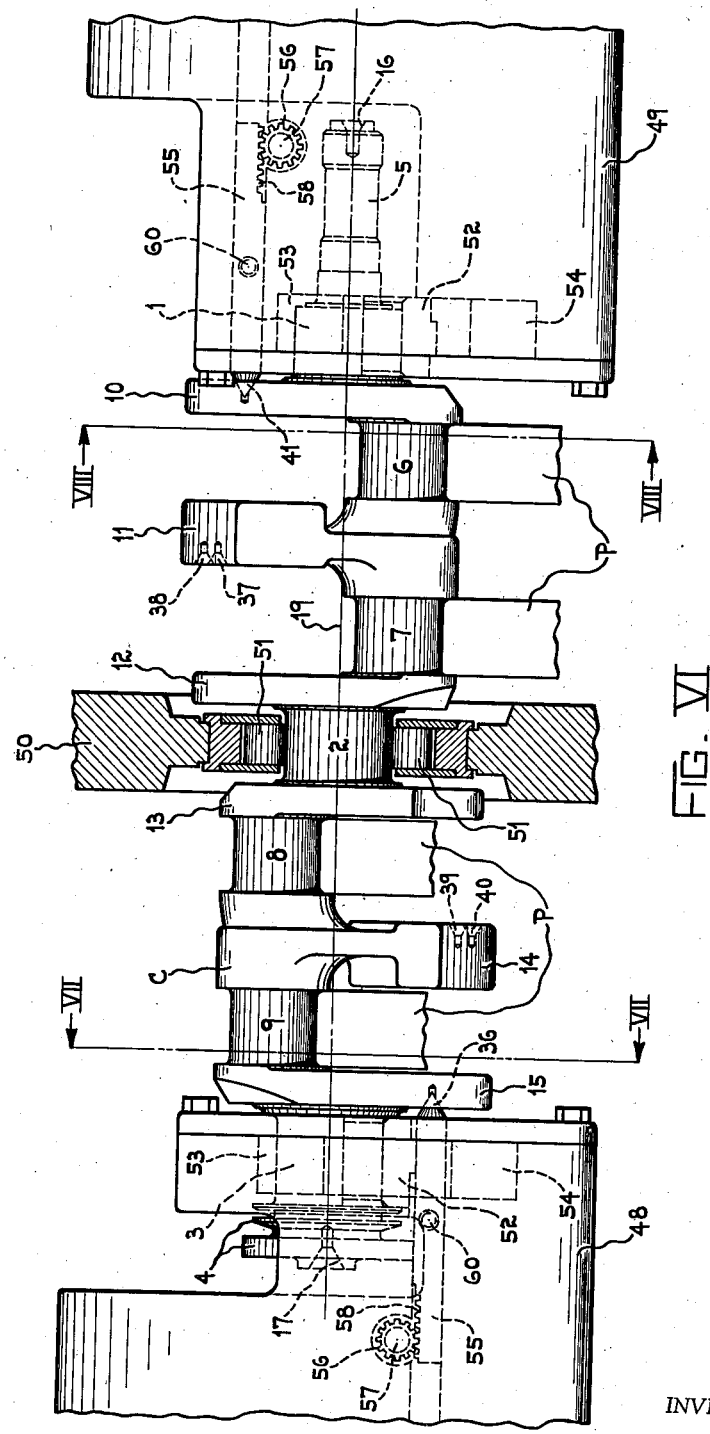

July 15, 1941.  W. L. GROENE  2,249,242
METHOD OF TREATING CRANKSHAFTS
Filed Jan. 2, 1940  6 Sheets—Sheet 6
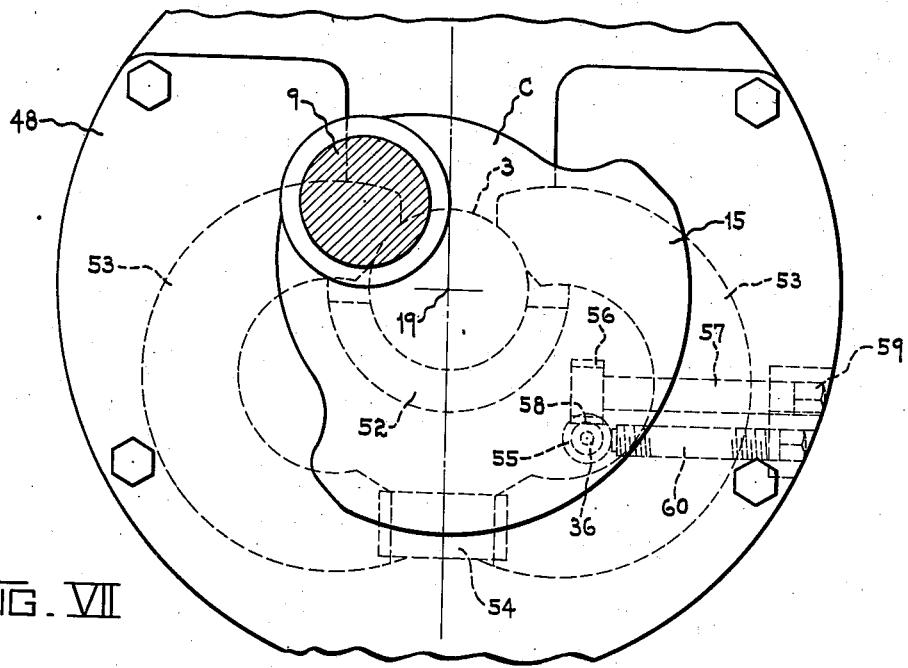
FIG. VII
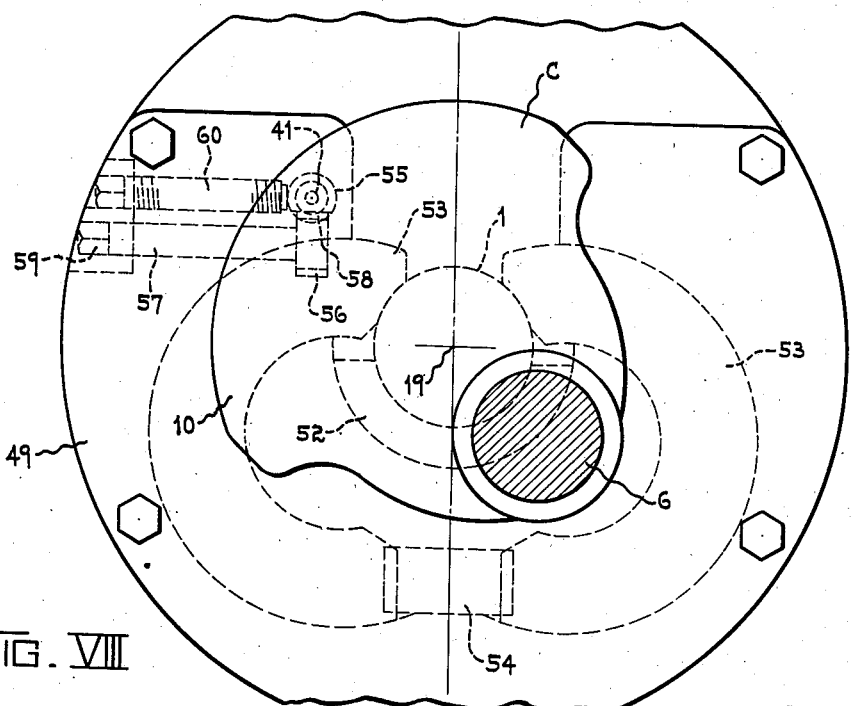
FIG. VIII
INVENTOR.
Willard L. Groene Patented July 15, 1941

2,249,242

UNITED STATES PATENT OFFICE 2,249,242

METHOD OF TREATING CRANKSHAFTS

Willard L. Groene, Cincinnati, Ohio, assignor to The R. K. Le Blond Machine Tool Company, Cincinnati, Ohio, a corporation of Delaware Application January 2, 1940, Serial No. 312,065

7 Claims. (Cl. 82—1)

This invention pertains to a method of procedure in preparing the rough forgings or castings and machining the bearing portions of multi-throw internal combustion engine crankshafts, particularly of the type utilized in the automotive industry. The chief object of this invention is to provide a series of unique carefully coordinated steps for turning all of the line bearings and all of the pin bearings of such crankshafts with an extremely high degree of accuracy commensurate with that of rough grinding operations heretofore done on such crankshafts. It is one of the chief objects of this invention to provide a system of steps through which the crankshaft is passed and by which the various bearing portions of the crankshaft are turned with runout of .001" or less.

Heretofore great difficulty has been experienced in former processes of turning the various bearing portions of crankshafts and which former steps have produced inaccurate work so that excessive final grinding had to be undertaken to correct the difficulty. As is well known in the art, excessive grinding operations are highly expensive and very wasting of productive time and it is therefore the object of this invention to advance the turning art to a point not heretofore attained in such type of work and to thereby eliminate the previously required expensive grinding operations.

In the past, processes of accurately turning crankshafts have been defective because:

(a) The gripping of rough work surfaces for the turning of the line bearings of the crankshaft has been found impractical because of the difficulty of making a proper equalizing chucking device to grip the shaft and chuck it accurately on the axis of rotation of the lathe.

(b) The rough work gripping chucking device has failed because of the impossibility of gripping the rough, scale covered web surfaces which caused the crankshaft to slip during the turning of the various bearing portions of the shaft, it being remembered that the slightest movement of the crankshaft in such chucking devices will render the important results of highly accurate turning within .001" or less wholly impossible.

(c) When chucking devices utilizing machined locating notches on the webs of the shaft are utilized, the difficulty has arisen from the machining of these locating notches on the webs which could not be accurately done because the crankshaft would spring under such machining operations, this being a well known major problem in the high productive work of premachining locating areas on crankshaft webs.

It is therefore an object of the present invention to first provide a system of machined locating holes in the sides of the webs of the crankshaft which holes may be machined therein without in any way distorting the crankshaft from its true axial position, that is, the shaft will be bent in no way whatever during machining of the prelocating areas in the sides of the web because all forces set up in the crankshaft during such operations take place along the length of the crankshaft, not sidewise of the crankshaft as in former methods.

It is also an object to provide chucking mechanism cooperating with such type of locating holes machined in the sides of the webs, in which the clamping action of said chucking devices cooperating with said locating holes will have no effect whatever on the axial displacement or bending of the crankshaft when placed in a lathe for the machining of its various bearing portions.

Another object of this invention is to set forth a series of unique steps to be followed beginning with the rough forging or casting of the crankshaft to the complete machining of all of the line bearings and all of the pin bearings of the crankshaft to extremely fine requirements of accuracy to thereby reduce to the very minimum the subsequent finish grinding and polishing operations required on the shaft and to thereby greatly reduce the time and cost of producing such crankshafts.

Further features and advantages of this invention will appear from the detailed description of the drawings in which:

Fig. I shows a rough forging or casting of a multi-throw crankshaft as it is received from the forge shop or foundry preparatory to the beginning of machining operations.

Fig. II shows the first step in the process comprising drilling center holes in the flange and stub ends of the crankshaft.

Fig. III shows the unique step of premachining locating holes in the sides of the webs of the crankshaft for purposes of chucking and locating the crankshaft for subsequent turning operations on the line bearings and the pin bearings of the crankshaft.

Fig. IV is an end view of the crankshaft showing the position of the locating holes in the sides of the webs as machined in Fig. III.

Fig. V shows the method of applying the unique chucking mechanism to the premachined locating holes in the sides of the webs of the crankshaft for supporting and rotating it in a double center drive crankshaft lathe for simultaneously machining all of the line bearing portions of the crankshaft.

Fig. VI shows the setup utilized for simultaneously machining all of the pin bearings of the crankshaft after the completion of the line bearing turning, utilizing the machined locating holes in the sides of the webs for the indexing and driving of the crankshaft for the pin turning operation.

Fig. VII is a view, on the line VII—VII of Fig. VI, showing one of the pot chucks for gripping the crankshaft in the pin turning operation.

Fig. VIII is a view, on the line VIII—VIII of Fig. VI, showing the other pot chuck for gripping the crankshaft in the pin turning operation.

Noting Fig. I, the rough crankshaft forging or casting C, in this particular illustrative showing, comprises the line bearings 1, 2, and 3, the flange end 4, and the stub end 5, constituting the line bearing portions of the crankshaft. In this particular crankshaft there are four crank pins 6, 7, 8 and 9, which are interconnected with each other and with the line bearings 1, 2 and 3 of the crankshaft by means of appropriate webs 10, 11, 12, 13, 14, and 15. The object of this particular methodical procedure of this case is to provide a series of unique steps carefully coordinated so as to provide for the accurate turning of the line bearing portions of the crankshaft within the limit of .001" or less runout and to likewise provide for the accurate turning of the pin bearings 6, 7, 8, and 9 with commensurate high degree of accuracy.

Having the forging or casting as shown in Fig. I, the first step of the process is to drill the center holes 16 and 17 (Fig. II) in the ends of the crankshaft by means of appropriate center drills 18, in the usual manner customary in procedures with respect to machining these ends of the crankshaft. The center holes 16 and 17 thus prepared define the axis of rotation 19 of the crankshaft in relation to which the various bearing portions are to be turned and accurately located at the completion of the machining operations.

The next step then is to take the crankshaft, as shown in Fig. III, and mount the crankshaft with its center holes 16 and 17 on appropriate centers 20 and 21 carried in the frame 22 of a locating hole drilling machine of unique construction and design. This machine is provided with a series of drill spindles 23, 24, 25, 26, 27, and 28 which are axially reciprocatable and rotatable by appropriate means, as is customary in drilling machines, in the frame 22 of the machine. These spindles 23 to 28, inclusive, carry appropriate drills 29, 30, 31, 32, 33, and 34 respectively which are thereby axially reciprocatable and rotatable by the work spindles through suitable chucks 35 of the work spindles.

After the crankshaft is placed on the centers 20 and 21 the various drills, (for illustrative purposes center drills are shown as being preferably used but this is not a limiting factor in the operation of this method, it being fully practicable to use any other type of drill which will make a suitable locating hole or impression in the crankshaft for the subsequent turning operation and chucking required therefore) 29 to 34, inclusive, are appropriately fed parallel with the axis of rotation 19 of the crankshaft C to drill locating holes in the sides of the webs of the crankshaft in such a way that the pressure exerted by this machining or drilling operation in no way tends to bend or to spring the crankshaft from its true axial position 19. Specifically, drill 29 machines a locating hole 36 in the side of the web 15 which is utilized in the pin turning operation. Drills 30 and 31 respectively drill locating holes 37 and 38 in the side of the web 11 while the drills 33 and 34 cut the respective locating holes 39 and 40 in the web 14. Drill 32 machines the locating hole 41 in the side of the web 10 for the pin turning operation. The holes in the webs 11 and 14 are utilized in turning the line bearings of the crankshaft.

Thus these locating holes are machined in the sides of the webs of the crankshaft by feeding movement and pressure on the crankshaft in a direction parallel to the axis of rotation 19 of the crankshaft so that no axial displacement or bending of the crankshaft can take place. The crankshaft is now premachined ready for the turning operations on the various bearing portions of the crankshaft.

Referring now to Fig. V, in which is shown the crankshaft chucked in the unique set of chucking devices which engage the webs 11 and 14 by means of the locating holes 37 and 38, in the web 11 and the locating holes 39 and 40 in the web 14 with gripping jaws 42 and 43 of the chucking devices in the ring gears 44 of a double center drive line bearing crankshaft lathe. These unique chucking jaws are pivotally mounted against lengthwise movement on pins 45 fixed in the ring gears 44. Their serrated end portions 42a and the locating pins 46 engaged in the locating holes 37, 38, 39, and 40 formed in the webs have clamping movement in a direction parallel with the axis of rotation 19 of the crankshaft so that the clamping action as effected by the clamping screw 47 threaded in the jaw 43 and passing through the jaw 42 has no effect whatever in axially bending or distorting the crankshaft from its true axis 19 as these jaws 42 and 43 are bound up on the crankshaft webs 11 and 14. The crankshaft is thus chucked for the operation of the cutting tools T to machine all of the line bearing portions on the crankshaft.

The utilization of these machined locating holes in the sides of the webs, which can be machined in the setup shown in Fig. III without in any way distorting the crankshaft from its true axial position 19, provides locating surfaces which are extremely accurate with respect to this axis of the crankshaft. By providing, in the chucking mechanism cooperating with these locating holes in the sides of the web, a clamping arrangement which is effective only in a line parallel with the axis of rotation 19 of the crankshaft, there can be no distortion in the shaft due to the clamping action of the chuck on the work piece. By this arrangement of premachining the locating holes in the sides of the web and of providing a chucking device whose clamping action is effective only in a direction parallel with the axis of rotation of the crankshaft, the machining of the line bearing portions by the tools T may be accomplished with a runout of .001" or less in all of the bearing portions being turned.

Having in this manner completed the highly accurate turning of the line bearing portions of the crankshaft, the crankshaft is then ready for the turning of the pin bearings 6, 7, 8 and 9. Referring to Fig. VI, the crankshaft C is here shown chucked in pot chucks 48 and 49 of an orbital lathe of a type, for example, as shown in Patent 2,138,964, having a steady rest 50 with appropriate steady rest journals 51 of a type, for example as shown in Patent 2,085,357, for supporting the accurately turned center line bearing 2 of the crankshaft. In each of the pot chucks 48 and 49 is provided a half bushing 52 which is fixed in the chuck bodies 48 and 49 concentric with the axis of rotation 19 of the lathe. The crankshaft is placed with its acurately machined line bearings 1 and 3 upon these half bushings 52 so as to properly align the axis of rotation of the crankshaft 19 and that of the lathe on the line 19. Appropriate clamping means, comprising the arcuate clamping jaws 53 actuated by suitable cam bar 54 hold the line bearings 1 and 3 securely against the half bushing 52 in a manner fully disclosed in Patent 2,030,142 cited above. The crankshaft is thereby accurately centered and aligned on the axis of rotation 19 in the lathe, the problem then being to index the crankshaft accurately in the chucking devices 48 and 49 so as to bring the respective pins 6, 7, 8 and 9 in proper synchronous rotative position with the orbital lathe tool mechanism and to provide mechanism for driving and rotating the crankshaft with the chucks 48 and 49.

This mechanism comprises a plunger 55 which is axially slidable in each of the chucking devices 48 and 49 parallel with the axis 19 of the lathe, and is adapted to be moved outwardly to engage the respective locating holes 36 and 41 formed in the respective webs 15 and 10 of the crankshaft thereby indexing the crankshaft in proper position in the chucking devices 48 and 49. These plungers 55 may be reciprocated axially by means of a pinion 56 formed integral with a suitable shaft 57 which engages a rack 58 formed on the plunger 55, the shaft 57 being provided with a suitable squared head 59 to which may be applied a suitable wrench for rotating the shaft 57. Having thus inserted the plungers 55 into the respective locating holes 36 and 41, the plungers are then locked by means of a suitable set screw 60 threaded in the chuck body 48 and 49 and bearing against the side of plungers 55 binding them in the chuck body when inserted appropriately into the locating holes in the webs of the crankshaft.

The conical points as shown in these illustrations may be made of a relatively steep angle or substantially straight if desired so as to provide adequate driving power on the respective terminal webs 10 and 15 of the shaft without in any way tending to bend the webs or distort these webs from their true position during the cutting operations of the various pin turning tools P on the pin bearings of the crankshaft. In this arrangement the previous highly accurate turning of the line bearing portion is relied upon to determine the turning of the pin bearings 6 to 9, inclusive, in accurate relation to the axis of rotation 19 of the crankshaft, the locating plungers serving to accurately index and drive the crankshaft without twisting the end webs 10 and 15 with respect to each other, during chucking in the orbital lathe.

Having thus fully set forth and described my invention what I claim as new and desire to secure by United States Letters Patent is:

1. A method of machining a crankshaft comprising the steps of: (a) drilling center holes in the ends of the crankshaft, (b) mounting said crankshaft on centers in said center holes and machining locating areas on the sides of the webs of said crankshaft by machining pressure exerted parallel with the axis of rotation of said crankshaft about said centers, (c) and utilizing said locating areas on the sides of the webs of said crankshafts for chucking in machining the bearing portions of said crankshaft.

2. A method of machining crankshafts comprising the steps of: (a) drilling center holes in the ends of the crankshafts, (b) mounting said crankshafts by means of centers in said center holes in a drilling machine and drilling center holes in the sides of the webs of said crankshaft by feeding pressure exerted parallel with the line connecting said centers of said drilling machine, (c) and utilizing said locating center holes in the ends of the shaft and in the sides of the webs for chucking in machining the bearing portions of said crankshafts.

3. A method of machining crankshafts comprising the steps of: (a) drilling center holes in each end of the crankshaft forging or casting, (b) placing said rough forging or casting on centers in said center holes in a drilling machine and drilling center holes in the sides of the webs of said crankshafts, (c) utilizing some of said center holes for the chucking and turning of the line bearings of said crankshafts, (d) and utilizing other of said locating center holes in turning the pin bearings of said crankshafts.

4. A method of machining crankshafts comprising the following steps of: (a) drilling center holes in the ends of the crankshafts, (b) positioning said crankshafts by means of centers in said center holes in a drilling machine and applying center drills to machine locating center holes in the sides of the faces of the webs of said crankshafts, (c) chucking said crankshafts by means of said center holes in a center drive line bearing lathe, (d) and chucking said crankshaft by means of said center holes in an orbital lathe.

5. A method of preparing a crankshaft for chucking in a lathe with a runout of .001" or less comprising the steps of: (a) preparing locating surfaces on the flange and stub ends of said crankshaft which define the axis of rotation of said crankshaft; the step (b) of supporting said crankshaft by means of said locating surfaces; and the step (c) of exerting pressure on said crankshaft while so supported, parallel to said axis of rotation to form locating surfaces for chucking said crankshaft intermediate said first mentioned locating surfaces.

6. A method of preparing a crankshaft for chucking in a lathe with a runout of .001" or less comprising the steps of: (a) preparing locating surfaces which define the axis of rotation of said crankshaft; the step (b) of supporting said crankshaft by means of said locating surfaces; and the step (c) of exerting pressure on said crankshaft, while so supported, parallel to said axis of rotation to form locating surfaces for chucking said crankshaft intermediate said first mentioned locating surfaces.

7. A method of preparing a crankshaft for chucking in a lathe with a runout of .001" or less comprising the steps of: (a) preparing locating surfaces on the flange and stub ends of said crankshaft which defines the axis of rotation of said crankshaft; the step (b) of supporting said crankshaft by means of said locating surfaces; and the step (c) of exerting pressure on webs of said crankshaft, while so supported, parallel to said axis of rotation to form locating surfaces for chucking said crankshaft on the axis of rotation of said lathe within said limits of runout.

WILLARD L. GROENE.